United States Patent [19]

Bast et al.

[11] 4,103,473

[45] Aug. 1, 1978

[54] APPARATUS FOR MAKING A COMPARTMENTED CONTAINER

[75] Inventors: Bernard John Bast, Bethlehem; Howard Elias Schaffer, Allentown, both of Pa.

[73] Assignee: Atlas Powder Company, Dallas, Tex.

[21] Appl. No.: 827,156

[22] Filed: Aug. 24, 1977

[51] Int. Cl.$^2$ .............................................. B65B 9/12
[52] U.S. Cl. .................................. 53/180 M; 156/497
[58] Field of Search ............ 53/14, 28, 138 R, 138 A, 53/177, 180 M, 182 M; 156/497

[56] References Cited

U.S. PATENT DOCUMENTS

| 3,918,235 | 11/1975 | Brown et al. | 53/180 M |
| 3,992,854 | 11/1976 | Howell et al. | 53/180 M |

*Primary Examiner*—Robert Louis Spruill
*Attorney, Agent, or Firm*—Richards, Harris & Medlock

[57] ABSTRACT

The apparatus for making a dual compartmented container includes a forming anvil having a resin supply tube therethrough. A mandrel including a catalyst supply tube and a trailing fin attached thereto is supported adjacent to the anvil. The anvil has generally a circular cross-section with a portion removed corresponding to the catalyst supply tube and the attached trailing fin. A continuous film of material, with a two-ply margin formed on one end, is guided around the anvil and mandrel with the mandrel positioned between the layers of the two-ply margin such that the margin completely encircles the mandrel. The edge of the film opposite the margin is encircled around the anvil and overlaps the outer layer of the two-ply margin. The edges of the material are joined to the underlying material to form two compartments by directing a stream of hot gases through the apertures of a sealing unit against the film. The sealing unit includes a nozzle through which the apertures are formed. The axes of the nozzle apertures are parallel one to the other and are oriented such that they form acute angles with tangents at the point of intersection of the axes with the anvil and mandrel. The flow of hot gases forms an airstream around the anvil and mandrel to force the edges against the film material lying therebelow while forming the seal. The two compartments are filled by a catalyst and resin, respectively. The filled compartments are then gathered and sealed at spaced lengths along the longitudinal length in order to form unitary packages of the reactive materials.

14 Claims, 9 Drawing Figures

APPARATUS FOR MAKING A COMPARTMENTED CONTAINER

FIELD OF THE INVENTION

This invention relates to an apparatus for making a container for packaging differing materials in separate compartments within the container. More particularly the invention relates to an apparatus for making a dual compartmented container for packaging reactive in close proximity so that the materials are admixed when the container is broken.

BACKGROUND OF THE INVENTION

Prior Art

In underground mining, numerous corridors are tunneled into the area to be mined to provide access to the coal or ore to be removed from the mine. Because of the many differing strata of material existing in almost all mined areas, securing the roof area to prevent the shifting and collapse of the strata when left unsupported above the corridors has been a primary problem in the mining activities. Thus, methods of safely securing the roof area are of primary interest, from the standpoint of both safety and expense, to the mining industry.

It has long been the practice to support mine roof areas by drilling anchor bolt holes into the rock formation and securing an anchor bolt therein to provide support to the many strata of rock existing above the corridors. For many years, a molley-type anchoring unit has been inserted into the uppermost portion of the drilled hole with the anchor bolt then inserted into the hole and retained therein by the molley fastener. More recently, it has been the practice to use a curable resin composition with a catalyst to fix anchor bolts into the roof area. The use of a curable resin and catalyst combination to attach the anchor bolts into the rock formation is superior to many prior art methods of attachment because the resin attaches the anchor bolt to the surrounding rock formation along the entire length of the bolt.

Where a curable resin and catalyst is used, it has been advantageous to use quick setting components because of the large quantities which must be installed and because insertion must generally be made overhead. It has also been beneficial to prepackage the resin and the catalyst in a single container having adjacent but separate compartments in which each of the components is housed. In this arrangement, the components are prepackaged in the proper proportions and are mixed within the drill holes by rupture of the container in the holes either immediately before, or by the insertion of the anchor bolts therein. This arrangement has been found especially useful when the surrounding structure does not permit easy access to the location of anchor bolts. Moreover, bringing the components together in this way prevents the premature mixture and thus setting up of the resin and catalyst and thus avoids the waste in time and materials occasioned by other methods of loading the resin and catalyst into the drill holes. Moreover, this arrangement provides a much more reliable attachment of the anchor bolts to the mine wall formations.

Packages heretofore used to compartmentalize a curable resin composition and an appropriate catalyst in an unitary container have suffered from several problems which have made them uneconomical or unreliable. While maintaining some degree of reliability, many prior art compartmented packages are very difficult to manufacture on a continuous basis and are not adaptable to a method of rapid package formation and loading. For example, U.S. Pat. No. Re. 25,869 to Schuermann, et al., issued Oct. 5, 1965, discloses an outer cartridge filled with a curing resin, with a separate capsule containing the catalytic hardener embedded within the filled capsule. Likewise, U.S. Pat. No. 3,302,410, to McLean, issued Oct. 20, 1965, discloses an inner compartment unattached to the outer compartment in which it is embedded. In U.S. Pat. No. 3,737,027, to Ball, issued June 5, 1973, the inner compartment is attached to the outer compartment only at the end thereby requiring that the two be made separately and joined after filling with the appropriate resin or hardener.

Some prior art systems have provided a dual component cartridge in which the two reactive constituents are packed initially in direct contact with no foreign membrane or packaging film of any kind between them. In such systems, the number of usable components are limited and storage and handling of the components is much more critical than in those products where the reactive constituents are separated by a nonreactive membrane. Also, the units have limited shelf life, and catalyst is wasted in forming the polymerized interface. Examples of these prior art systems are found in U.S. Pat. No. 3,731,791 to Fourcade, et al., issued May 8, 1973, and U.S. Pat. No. 3,915,297 to Rausch, issued Oct. 28, 1975.

U.S. Pat. No. 3,861,522 to Llewellyn, et al., issued Jan. 21, 1975, discloses a compartmented package made from a single pliable film material. Dual compartments are formed by forming the film material into a tubular shape and overlapping one edge over the other. The film material is joined to itself at opposite sides of the container. As a result, heat-sealing structure must be provided on both sides of the package as it is being formed.

Other prior art designs, while readily formed and loaded continuously, do not provide a sealing arrangement which assures that the two components will remain separated or within the container during shipping, handling and storage prior to the container's use. U.S. Pat. No. 4,009,778 to Howell, issued Mar. 1, 1977, discloses a dual compartmented package formed by using a single seal to join three plys of material to form the two compartments. In this arrangement, problems are encountered in attempting to seal all three layers of material along one seam. Where the seam is formed by directing a stream of hot gas against the package, temperatures required to adequately seal the innermost layer cause burning of the outermost layer. Where the temperatures are maintained at a level which is optimum to appropriately seal the outermost layer, the temperature is insufficient to adequately seal the innermost layer. Thus, this arrangement has been unsuccessful.

SUMMARY OF THE INVENTION

The present invention provides an apparatus for forming a dual compartmented container from a single continuous roll of film material. Each of the compartments are formed by a single seal joining only two layers of the film material. By forming the seal from only two layers of film material, the strength and integrity of each juncture or seam can be more accurately controlled thus assuring that the seams will not fail prior to use of the container.

The apparatus for making a dual compartmented container includes a forming anvil having a resin supply tube therethrough. A mandrel including a catalyst supply tube and a trailing fin attached thereto is supported adjacent to the anvil. The anvil has generally a circular cross-section with a portion removed for positioning the catalyst supply tube and the attached trailing fin. The anvil and mandrel combination forms a cylinder with a passageway therebetween. A continuous film of material having a first and second longitudinal edge is directed toward the anvil and mandrel combination. The first edge of the film is folded onto the film to form a two-ply margin on one side about a fold seam. The film, with the two-ply margin, is guided around the anvil and mandrel with the mandrel positioned between the layers of the two-ply margin such that the margin completely encircles the mandrel. The second edge of the film is encircled around the anvil and overlaps the outer layer of the two-ply margin.

The first edge of the film is attached to the film adjacent therebelow along a continuous seam to form the first compartment. The second edge of the film is attached to the outer layer of the two-ply margin intermediate of the fold seam and the first edge of the film along a continuous second seam. This second seam is adjacent to the first seam and forms the second compartment. The two compartments are filled by a catalyst and resin from the catalyst supply tube and resin supply tube, respectively. The filled compartments are then gathered and sealed at spaced lengths along the longitudinal length in order to form unitary packages of the reactive materials.

Both seams are formed by joining only two layers of film material. In a preferred embodiment of the invention, these seams are made by directing a stream of hot gases through the apertures of a heater heating unit against the film. The heater unit includes a nozzle through which the apertures are formed. The axes of the nozzle apertures are parallel one to the other and are oriented such that they form acute angles with tangents at the point of intersection of the axes with the anvil and mandrel. In this arrangement, the flow of hot gases around the anvil and mandrel are in the direction the first and second edges are wrapped around these components. In this way the flow of hot gases tends to force the edges against the film material lying therebelow to form the seal required. The position of the second edge is also substantially in line with the trailing edge of the fin attached to the catalyst supply tube. Thus, the fin provides support for joining the second edge to the underlying film material to generate the second seam. The first edge of the material overlies film material which is supported by the anvil. Thus, the anvil provides support for forming the first seam.

The nozzle also is adapted with a forward face inclined relative to the axes of said apertures so that the openings of the apertures at the face of the nozzle are substantially equal distance from the anvil and mandrel. The nozzle is formed such that the passageways are equal lengths thereby assuring an even flow of hot gases from the apertures.

Reactive components are loaded into the container in the first and second compartments. For example, a catalyst may be loaded into the first compartment and a polyester resin, which hardens when mixed with the catalyst, is loaded in the second compartment. The quantity of materials in the compartments is sufficient to produce a tubular product with a substantially circular transverse cross-section. After loading, the package is selectively gathered at predetermined points along its longitudinal length and closed by appropriate clips to form a unitary package containing reactive components in separate but adjacent compartments.

The present invention also provides a method for making the dual compartmented container of the present invention wherein two separate seams each joining two layers of the film material are generated to form the two compartments. The method includes feeding a single continuous sheet of material having a first and second longitudinal edge to a forming area. The first edge of the sheet is folded onto the sheet to form a two-ply margin along one side of the sheet. The sheet is guided around a forming anvil and a mandrel with the mandrel positioned between the two layers of the margin and the second edge of the sheet overlapping the two-ply margin.

The mandrel includes a material supply tube and a trailing fin attached thereto. The mandrel is supported adjacent the anvil and together the two form a cylinder with a passageway therebetween. The first edge of the sheet is attached to the sheet therebelow along a longitudinal seam to form a continuous first compartment. The second edge of the sheet is attached to the outer layer of the two-ply margin to form a second compartment. In each seam, only two layers of film material are joined to complete the compartment, and the seams are adjacent to but not coincident one with the other.

In another embodiment of the invention, the dual seams forming the film material into a dual compartmented container are formed by directing a stream of hot gas onto the film material to bond the layers of material one to the other. The hot gas is directed from a nozzle having apertures therein directed toward the first and second edges. The axes of the nozzle apertures are parallel one to the other and form acute angles with the tangents at the point of intersection of the axes with the anvil and mandrel. The flow of hot gases around the anvil and mandrel against the first and second edges causes the edges to bear against the underlying film and to be joined to form the compartments. The dual compartments are then filled with reactive materials, gathered at predetermined points along the longitudinal length of the formed and filled compartments and closure clips crimped therearound. The container is then severed to form a unitary package having dual compartments therein each containing a reactive material.

BRIEF DESCRIPTION OF THE DRAWINGS

For a more complete understanding of the present invention, and for further details and advantages thereof, reference is now made to the following description taken in conjunction with the accompanying drawings, in which.

DESCRIPTION OF THE PREFERRED EMBODIMENTS

The present invention is directed to an apparatus for forming a dual compartmented container for packaging reactive materials therein. In a primary embodiment of the invention, a continuous dual compartmented tube is formed from a continuous sheet of single layer film material. The reactive components are then loaded into the separate compartments, and the continuous tube, filled with the reactive material, is divided into predetermined lengths of packaged reactants.

Figure 1:
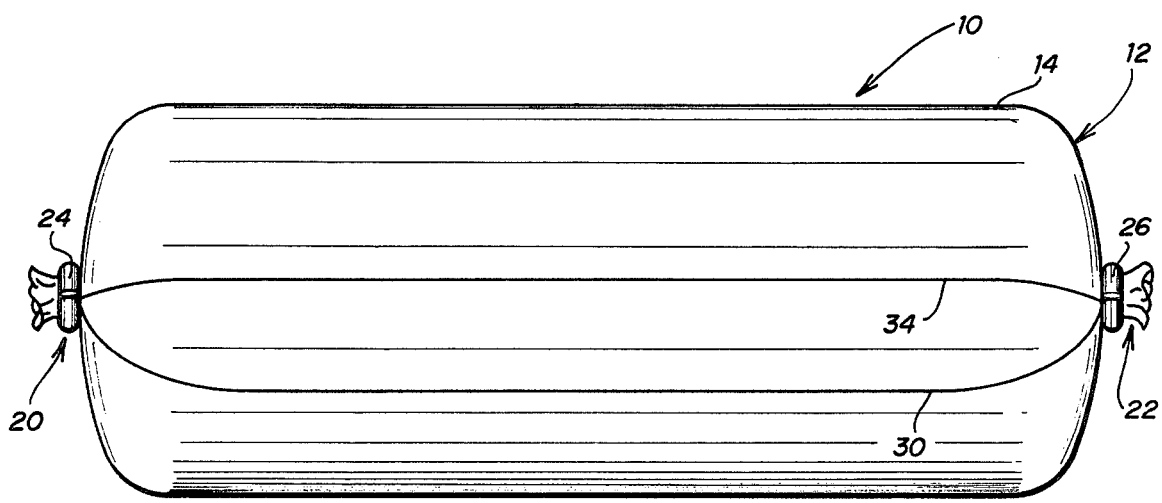
FIG. 1 illustrates a side plan view of the product of the present invention.
Figure 3:
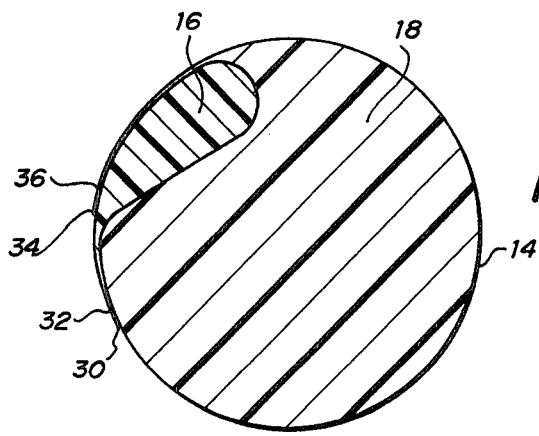
FIG. 3 is a cross-sectional view of the package of FIG. 1.
Figure 2:
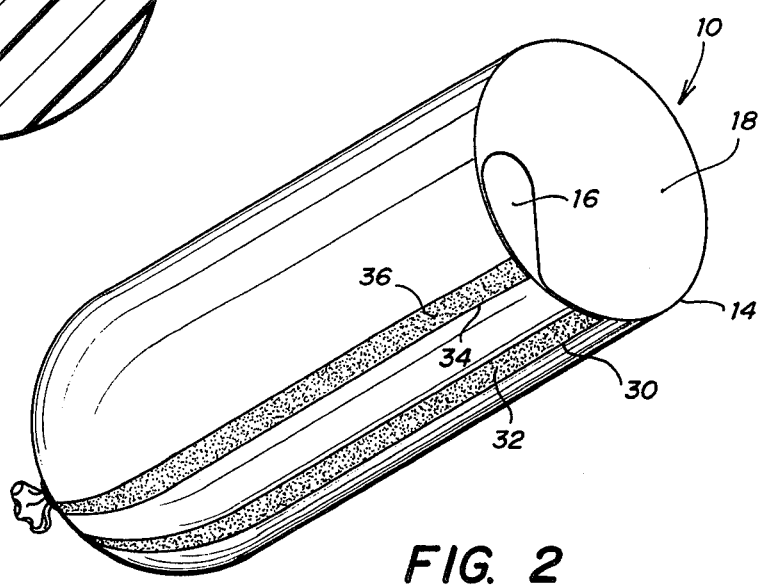
FIG. 2 shows the product illustrated in FIG. 1 with one end cut away to show the formation of the dual compartments.

A dual compartmented container 10 formed by the apparatus of the present invention is illustrated in FIG. 1 and shown with one end removed in FIG. 2. Container 10 includes an outer skin 12 formed from a single sheet of film material 14. Container 10 has generally a circular cross-section throughout its length with a first compartment 16 formed within a larger second compartment 18. Compartment 16 is normally loaded with a catalyst material for mixing with a polyester resin within compartment 18. Container 10 is gathered on its ends 20 and 22 to retain the catalyst and polyester resin within the package. Ends 20 and 22 are retained in their gathered position by clips 24 and 26, respectively.

Compartment 16 of container 10 is formed by looping a first edge 30 of film material 14 onto itself to form a two-ply layer of material. Edge 30 is then joined to the film material on which it is folded to form a seam 32. Seam 32 is formed continuously along the longitudinal length of container 10 and is substantially parallel to the longitudinal axis of the container.

Compartment 18 is formed by attaching edge 34, opposite edge 30, of the film material to the outer ply forming compartment 16 along a seam 36 adjacent to but not overlapping seam 32. In this way, seam 32 and seam 36 consist of attaching only two plies of material to form a high integrity compartmented container.

Figure 4:
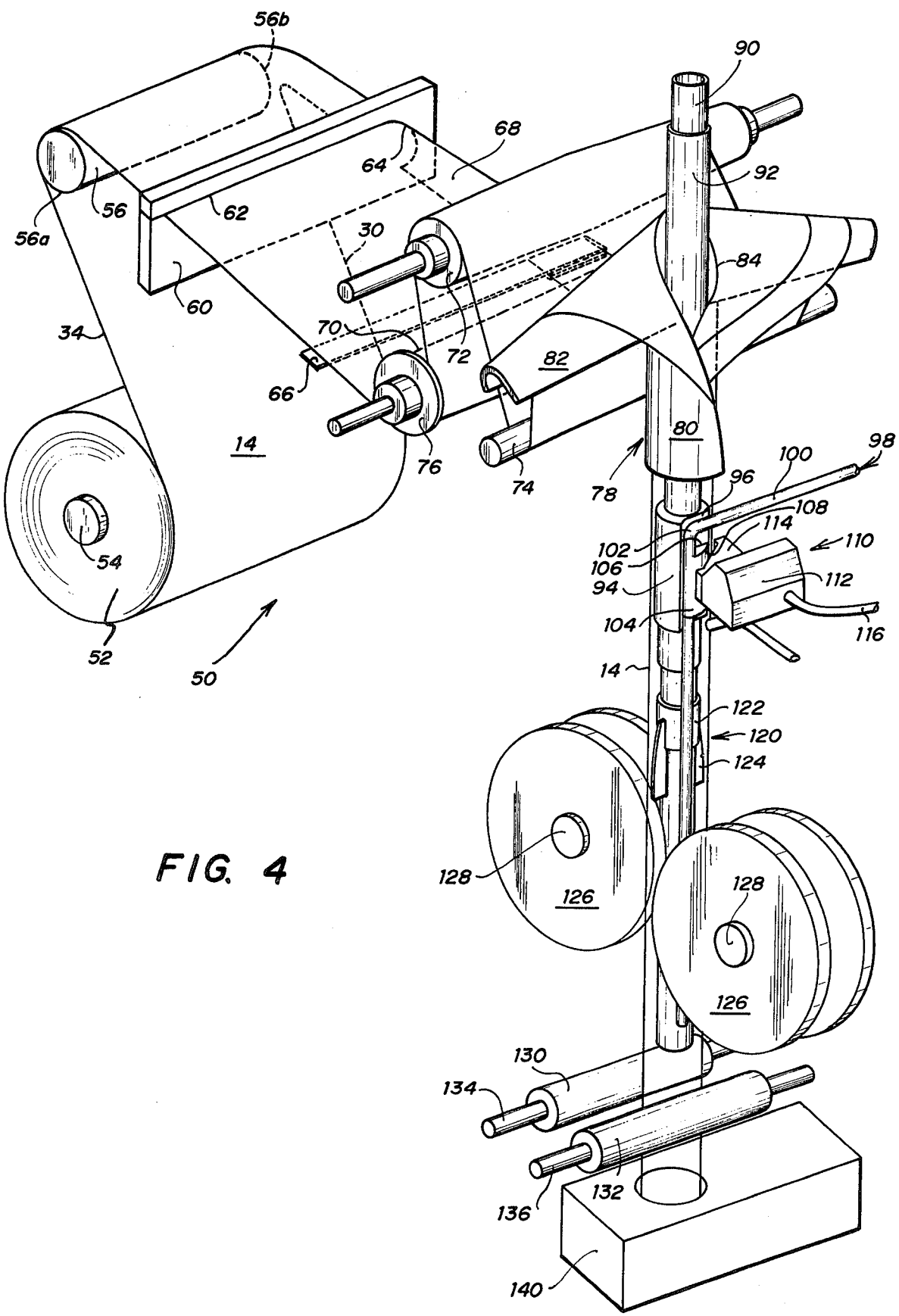
FIG. 4 is a perspective view of the apparatus for continuously forming the product of the present invention.

An apparatus 50 embodying the present invention for continuously forming containers 10 is illustrated in FIG. 4. Film material 14 is supplied from a drum 52 which is rotated on an axis shaft 54. Film material 14 is directed around a roller 56 with end 56a aligned with edge 34 of film material 14. Roller 56 is slightly shorter in length than the width of film material 14 such that end 56b of roller 56 is positioned slightly inside of edge 30 of film material 14. By so locating roller 56, edge 30 begins to turn under as film material moves over the roller. Film material 14 is directed through a folding guide 60 having a slot 62 with a curved end 64 therein. As material 14 is directed through guide 60, edge 30 is folded under the adjacent portion of the material. Film material 14 is then directed through folder 66 which completes the folding of edge 30 and a side portion of the material under the remainder of the material to form a two-ply margin 68.

Material 14, with two-ply margin 68 formed along one side thereof, is wrapped in a serpentine path around three crown rollers 70, 72, and 74. Circular discs 76 are attached near each end of crown roller 70 to limit the movement of film material 14 from side-to-side on the roller. As film material 14 comes off of roller 74, it is carried over a film folder 78 which includes a neck 80 supporting a pair of forming shoulders 82. Neck 80 is an incomplete cylinder with its front ends overlapping each other. Neck 80 joins forming shoulders 82 to form an oval intersection 84. Oval intersection 84 has its apex at the upper back of shoulders 82 and curves downwardly and forwardly to the front of neck 80 where each end of the intersection 84 overlaps the other as the front ends of neck 80 overlap.

Film material is drawn over shoulders 82 and directed into neck 80 with the middle of the film material being drawn into the interior of neck 80 first. Film material 14 is formed into a cylinder shape with margin 68 underlying edge 34 of the film material. Thus, the double-ply margin 68 is positioned interiorally of edge 34 of film material 14.

A polyester resin supply tube 90 is supported through the opening formed by neck 80. A tapered stiffener 92 is attached at the upper end of tube 90 with its lower end extending partially into the opening formed by neck 80. A forming anvil 94 is attached to supply tube 90 immediately below neck 80. Anvil 94 generally has a circular upper section but with a portion removed to form a flat surface 96.

A catalyst mandrel 98, including a supply tube 100 and a fin 104, is attached to tube 100 below elbow 102 and supported adjacent anvil 94. Tube 100 and fin 104 together form an airfoil-shaped structure with a flat surface 106 slightly spaced from but substantially parallel to flat surface 96 of anvil 94. The surface 108 of fin 104 opposite surface 106 is slightly curved with the same radius as the circular portion of anvil 94 and is positioned coincident with the continuation of the circumference of anvil 94. Thus, anvil 94 and tube 100 and fin 104 form a cylindrical support for film material 14 as it is wrapped into a tubular configuration by folder 78 and passes out of neck 80.

A sealer unit 110, including a heater unit 112, a directional nozzle 114 and an air inlet supply 116, is supported immediately below elbow 102 of tube 100 and in close proximity to anvil 94 and catalyst mandrel 98. Sealer unit 110 operates to seal film material 14 into the dual compartmented container, the subject of the present invention.

As the film material passes out of neck 80, edge 34 is directed to the outside of tube 100 as is the outer layer of margin 68. The inner layer of margin 68 is directed to the inside of tube 100 and fin 104 such that the catalyst supply tube 100 is sandwiched between the inner and outer layers of margin 68. Immediately below the lower end of neck 80, edge 30 is sealed to the underlying film material to form seam 32 and inner compartment 16. Simultaneously therewith, edge 34 is sealed to the outer layer of margin 68 to form seam 34 adjacent but to one side of seam 32. In a preferred embodiment of the invention, the sealing of seams 32 and 36, are formed by passing a stream of hot gas from nozzle 114 of sealing unit 110 against film material 14 as it moves downwardly past the sealer unit.

A film spreader 120 is attached to tube 90 below sealer unit 110. Film spreader 120 includes a tubular collar 122 having a pair of opposed wings 124 extending radially therefrom. Wings 124 elongate film material 14 as it passes therepast to allow drive rollers 126 to pinch the film material therebetween and draw the sealed tube downwardly past the lower ends of resin supply tube 90 and catalyst tube 100. Film dirve rollers 126 are supported for rotation on axis 128.

Below the sealer unit, the film material has been sealed into a dual compartmented container. Polyester resin is then loaded into the larger compartment as the container passes the lower end of resin supply tube 90, and a catalyst is supplied to the smaller compartment as the container passes the lower end of catalyst supply tube 100.

A pair of void rollers 130 and 132 are supported for rotation on shafts 134 and 136, respectively, on opposite sides of the filled container below film drive rollers 126. The void rollers 130 and 132 are synchronized to move inwardly against the filled container to void spaced sections along the container as it is moved through the unit. As this void passes into a clamping unit 140, the voided area is sequentially gathered together, and a pair of suitable clips bound therearound. The tube is then severed between the clips to produce each container 10 substantially as shown in FIG. 1 and 2.

Figure 6:
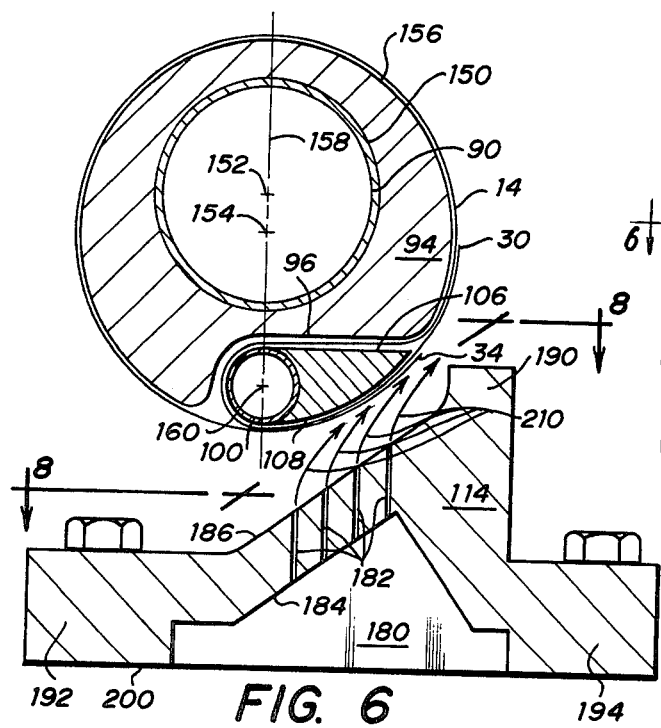
FIG. 6 is a section view taken along line 6—6 of FIG. 5.
Figure 5:
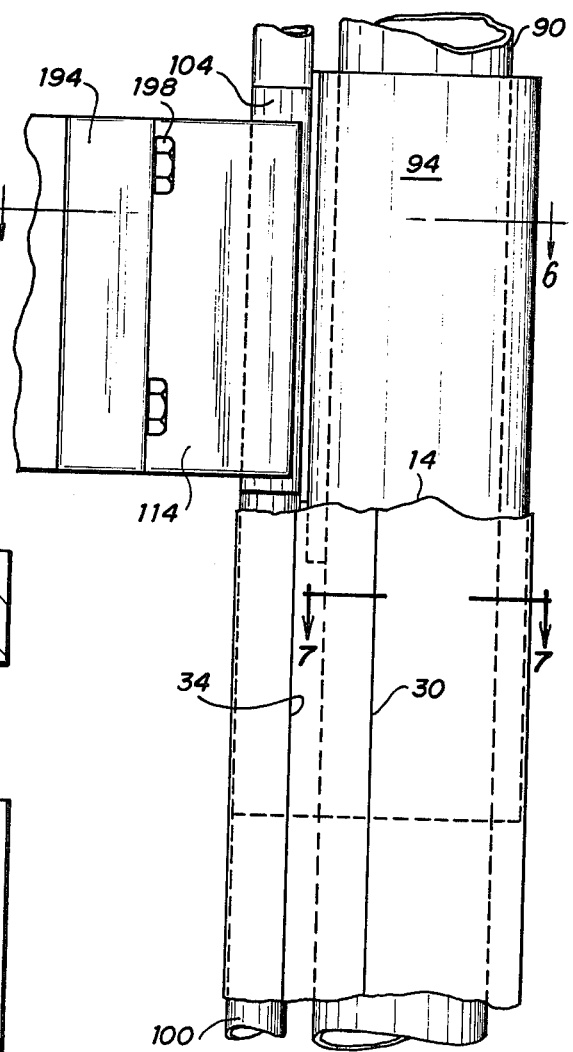
FIG. 5 is a side elevation of the apparatus of FIG. 4 showing the sealing unit, anvil and mandrel with the film material broken away.
Figure 7:
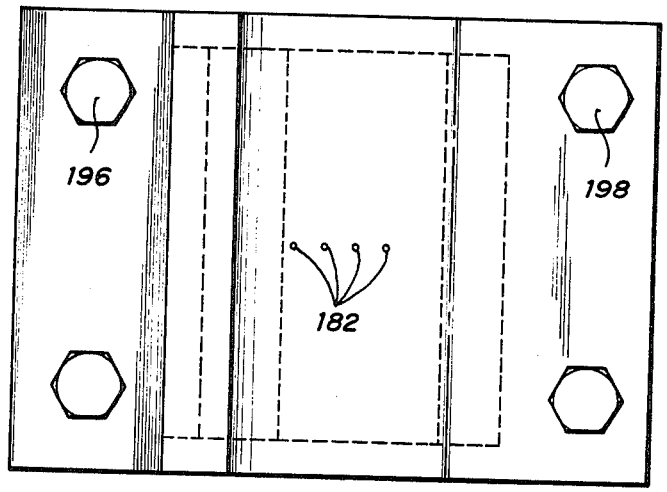
FIG. 7 is a section view taken along line 7—7 of FIG. 5.

Referring to FIGS. 5, 6 and 7, anvil 94 has a bore 150 formed therethrough for receiving resin supply tube 90. Anvil 94 is secured to supply tube 90 by appropriate set screws (not shown) or by providing a force fit therebetween. The center of bore 150, identified by the numeral 152, is offset from the center, identified by numeral 154, of the outer cylindrical surface 156 of anvil 94. Referring to FIG. 6, a portion of the outer cyindrical form of anvil 94 is cut away to form a flat planar surface 96 which is substantially perpendicular to a line identified by numeral 158, through centers 152 and 154 of bore 150 and outer surface 156, respectively.

As described hereinabove, catalyst supply tube 100 has a fin 104 attached thereto to form an airfoil-shaped structure. The center of catalyst supply tube 100, identified by the numeral 160, is positioned on an extension of line 158 through centers 152 and 154 with the flat surface 106 of fin 104 substantially parallel to the flat surface 96 of anvil 94. The outer curved surface 108 of fin 104 is substantially coincident with an arc, the continuation of the outer cylindrical surface 156 of anvil 94.

As can be seen in FIG. 6, film material 14 is wrapped around anvil 94 and catalyst mandrel 98 with one end looped around catalyst mandrel 98 and the remainder of the film wrapped around anvil 94 and onto the outer layer of film over the catalyst mandrel. This arrangement provides the first and second chambers of the container of the present invention.

Referring to FIGS. 5 and 7, the bottom portion of anvil 94 is tapered on one side to reduce the resistance to the downward movement of film material 14. A cooling tube is supported below sealing unit 110 and directs cool air against the seams subsequent to forming.

Figure 8:
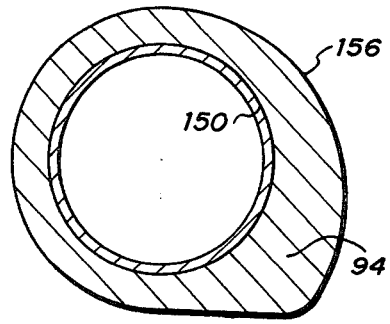
FIG. 8 is a side elevation of the heating unit as seen from along line 8—8 of FIG. 6.

Nozzle 114 which directs heated gases against the appropriate areas of the film material to seal the material is best illustrated in FIGS. 6 and 8. Nozzle 114 includes a plenum chamber 180 from which heated gases from heater unit 112 is directed. Pressurized gas is forced from plenum 180 through a plurality of passageways 182 formed through the nozzle. Passageways 182 communicate between inclined wall 184 of plenum 180 and inclined outer face 186 of the nozzle. As shown in FIG. 6, inclined wall 184 is substantially parallel to inclined face 186 such that the passageways are of equal length. A directional ridge 190 is formed at the apex of inclined face 186 and directs the flow of hot air around anvil 94 and mandrel 98. Nozzle 114 is formed with flanges 192 and 194 and appropriate holes therethrough to receive bolts 196 and 198 for attachment to heater unit 112.

In a preferred embodiment of the invention, the back wall 200 of nozzle 114 is mounted such that it is substantially perpendicular to an extension of the line 158 through centers 152, 154 and 160 of resin tube 90, anvil 94 and catalyst tube 100. Because passageways 182 are perpendicular to back wall 200, these passageways are then substantially parallel to line 158 through the centers of resin supply tube 90, anvil 94 and catalyst supply tube 100. Inclined wall 184 and inclined wall 186 of nozzle 114 are inclined 35 degrees from back 200 of nozzle 114. As is shown in FIG. 6, the axes of passageways 182 form acute angles with tangents at the points of intersection of these axes with the outer surface 156. With this orientation, the gases directed from passageways 182 flow around anvil 94 and mandrel 98 and tend to engage edges 30 and 34 downwardly against the underlying material to which they are sealed. As is shown in the preferred embodiment of FIG. 8, only a single row of four passageways 182 is formed through nozzle 114.

Figure 9:
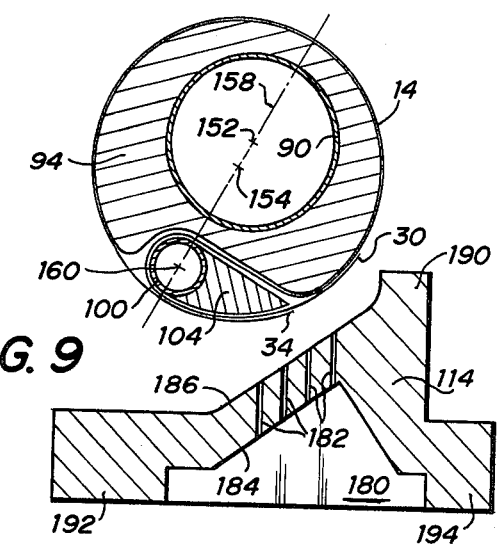
FIG. 9 illustrates the relationship between the sealing unit, anvil and mandrel in an alternative embodiment of the present invention.

Although the relationship of the nozzle 114 to anvil 94 and catalyst mandrel 98 is important to the proper operation of the unit, the specific alignment hereinabove described with respect to the preferred embodiment is not critical to the practice of the present invention. While it has been found that the relationship herein described between the resin supply tube, the anvil and the catalyst supply tube with nozzle 114, and the relationship of the passageways through which heated air is directed against the film material, have been successful for forming the product of the present invention, other arrangements between the nozzle and the film material can be adopted without departing from the spirit of the present invention. For example, FIG. 9 illustrates an alternative arrangement between the nozzle and anvil 94, catalyst supply tube 100 and fin 104. In this arrangement, anvil 94, catalyst supply tube 100 and fin 104 are rotated to permit more direct contact of the gases supplied through passageways 182 onto the areas to be sealed.

Likewise, although face 186 of nozzle 114 has been described as inclined 35° from the back wall 200 of nozzle 114, the use of various angular inclines are envisioned by the present invention. Also, face 186 may be curved to conform to the curvature of anvil 94 and fin 104.

In producing containers of the present invention, film material is engaged between drive rollers 126 and drawn from drum 52 over crowned rollers 70, 72 and 74 and into film folder 78. In film folder 78, the film material is formed into a tubular shape with the two-ply margin 68 underlying the opposite edge 34 of the film material. As the material moves onto anvil 94 and around catalyst tube 100 and fin 104, the film material takes the form illustrated in FIG. 6. Pressurized air is directed into and heated in heater unit 112 and through passageways 182 of nozzle 114 against the film material.

Referring to FIG. 6, an airstream of heated gases, indicated generally by arrows 210, impinge film material near edge 34 and force it, with the underlying material, against fin 104. The airstream continues around anvil 94 guided partially by ridge 190 of nozzle 114 and forces the film material near edge 30 and the underlying film material, against anvil 94. The temperature of the heated gas is controlled to sufficiently melt the material so that the inner and outer layers of material are attached forming two seals adjacent one to the other.

The position of fin 104 has been found important to the successful completion of the seams. The underlying support provided by fin 104 prevents buckling or pinching of the film material and thus assures a continuous seam of high integrity. This is crucial in the production of resin capsules in that any leakage, even though at only one point along the length of a seam, results in a defective product.

Thus, the present invention provides a product in which the seams for creating the dual compartments are formed by joining only two layers of film material but with the joints at adjacent positions so that only a single sealing unit and directional controls are needed to complete the package. Where only two layers of material are sealed to form the seams of the container, the temperature of the sealing system may be controlled to assure a seam of high integrity thereby overcoming the problems heretofore experienced in other units. Moreover, the present invention provides a substantially improved anvil, mandrel arrangement and sealing unit which makes possible the sealing required to produce a highly reliable compartmented container.

Although preferred embodiments of the invention have been described in the foregoing detailed description and illustrated in the accompanying drawings, it will be understood that the invention is not limited to the embodiments disclosed, but is capable of numerous rearrangements, modifications and substitutions of parts and elements without departing from the spirit of the invention. The present invention is therefore intended to encompass such rearrangements, modifications and substitutions of parts and elements as fall within the scope of the appended claims.

What is claimed is:

1. An apparatus for making a dual compartmented container, comprising:
    a forming anvil including a material supply tube therethrough,
    a mandrel supported adjacent to said anvil including a material supply tube and a trailing fin attached thereto, said mandrel and anvil forming a cylinder with a passageway therebetween,
    means for feeding a continuous film of material having first and second longitudinal edges toward said anvil and mandrel combination,
    means for folding the first edge of the film onto the film to form a two-ply margin on one side of the film about a folded seam,
    means for guiding the film around said anvil and mandrel with said mandrel positioned between the layers of the two-ply margin such that the two-ply margin completely encircles said mandrel and with the second edge of the film encircling said anvil and overlapping the outer layer of the two-ply margin,
    means for attaching the first edge of the film to the film adjacent therebelow along a continuous first seam to form a first compartment and for attaching the second edge of the film to the outer layer of the two-ply margin intermediate of the fold seam and the first edge of the film along a continuous second seam adjacent the first seam to form a second compartment,
    means for filling the compartments with different substances, and
    means for gathering and sealing the compartments at spaced lengths along the longitudinal length thereof.

2. The apparatus according to claim 1 wherein said means for attaching the first edge of the film and the second edge of the film comprises:
    a heater nozzle positioned adjacent said edges, said nozzle having apertures therein directed toward the first and second edges, and
    means for directing a stream of hot gas through the apertures of said nozzle against the film to join the first edge of the film to the film therebelow and the second edge to the outer layer of the two ply margin.

3. The apparatus according to claim 2 wherein the axes of said nozzle apertures are parallel one to the other and form acute angles with tangents at the point of intersection of the axes with the anvil and mandrel.

4. The apparatus according to claim 3 wherein said nozzle includes a forward face inclined relative to the axes of said apertures.

5. In an apparatus for continuously forming a series of containers from a single film of material having a first and second longitudinal edge, wherein the first edge of the film is folded onto the film to form a two-ply margin on one side of the film about a fold seam, and the film formed into a tube, the tube sealed to form two distinct compartments, the compartments filled with different substances, the filled tube gathered at two positions along its length and sealed at each gathered portion to form a unitary package, said apparatus comprising:
    a forming anvil,
    a mandrel supported adjacent said anvil, said mandrel being contoured such that the mandrel and anvil form a cylinder with a passageway therebetween,
    means for forming the tube by guiding the film around said anvil and mandrel with said mandrel positioned between the layers of the two-ply margin such that the two-ply margin completely encircles said mandrel and with the second edge of the film encircling said anvil and overlapping the outer layer of the two-ply margin,
    means for attaching a first edge of the film to the film adjacent therebelow along a continuous first seam to form the first compartment and for attaching the second edge of the film to the outer layer of the two-ply margin intermediate of the fold seam and the first edge of the film along a continuous second seam adjacent the first seam to form the second compartment such that said first and second seams are formed adjacent thereto by joining only two layers of film material.

6. The apparatus according to claim 5 wherein said means for attaching the first edge of the film and the second edge of the film comprises:
    a heater nozzle positioned adjacent said edges, said nozzle having apertures therein directed toward the first and second edges, and
    means for directing a stream of hot gas through the apertures of said nozzle against the film to join the first edge of the film to the film therebelow and the second edge to the outer layer of the two-ply margin.

7. The apparatus according to claim 6 wherein the axes of said nozzle apertures form acute angles with tangents at the point of intersection of the axes with the anvil and mandrel.

8. The apparatus according to claim 7 wherein said nozzle includes a forward face inclined relative to the axes of said apertures.

9. The apparatus according to claim 8 wherein the apertures in said nozzle are passageways of equal lengths.

10. The appartus according to claim 6 wherein the apertures in said nozzle are in a single plane perpendicular to the longitudinal axes of said anvil and mandrel.

11. In an apparatus for continuously forming a series of containers from a single film of material having a first and second longitudinal edge, wherein the first edge of the film is folded onto the film to form a two-ply margin on one side of the film about a fold seam, and the film formed into a tube, the tube sealed to form two distinct compartments, the compartments filled with different substances, the filled tube gathered at two positions along its length and sealed at each gathered portion to form a unitary package, said apparatus comprising:

a forming anvil, a mandrel supported adjacent said anvil, said mandrel being contoured such that the mandrel and anvil form a cylinder with a passageway therebetween, means for forming the tube by guiding the film around said anvil and mandrel with said mandrel positioned between the layers of the two-ply margin such that the two-ply margin completely encircles said mandrel and with the second edge of the film encircling said anvil and overlapping the outer layer of the two-ply margin, a heater nozzle positioned adjacent said edges, said nozzle having apertures therein directed toward the first and second edges with the axes of said nozzle apertures forming acute angles with tangents at the point of intersection of the axes with the anvil and mandrel, and means for directing a stream of hot gas through the apertures of said nozzle against the film to join the first edge of the film to the film therebelow and the second edge to the outer layer of the two-ply margin to form the two compartments.

12. The apparatus according to claim 11 wherein said nozzle includes a forward face inclined relative to the axes of said apertures.

13. The apparatus according to claim 12 wherein the apertures in said nozzle are passageways of equal lengths.

14. The apparatus according to claim 11 wherein the apertures in said nozzle are in a single plane perpendicular to the longitudinal axes of said anvil and mandrel.

* * * * *